United States Patent
Walding

[19]

[11] Patent Number: 6,031,845
[45] Date of Patent: Feb. 29, 2000

[54] ALLOCATION OF BANDWIDTH TO CALLS IN A WIRELESS TELECOMMUNICATIONS SYSTEM

[75] Inventor: Andrew M. Walding, Sunninghill, United Kingdom

[73] Assignee: Airspan Communications Corporation, Wilmington, Del.

[21] Appl. No.: 08/969,183

[22] Filed: Nov. 12, 1997

[30] Foreign Application Priority Data

May 14, 1997 [GB] United Kingdom .................... 9709802

[51] Int. Cl.[7] ................................. H04J 3/16; H04L 7/24
[52] U.S. Cl. .......................... 370/468; 370/335; 370/521
[58] Field of Search .................................. 370/335, 329, 370/338, 341, 342, 441, 465, 468, 521; 455/450, 452, 464, 554, 555; 375/240

[56] References Cited

U.S. PATENT DOCUMENTS

| | | | |
|---|---|---|---|
| 5,392,284 | 2/1995 | Sugiyama | 370/84 |
| 5,463,616 | 10/1995 | Kruse et al. | 370/24 |
| 5,517,500 | 5/1996 | White et al. | 370/85.1 |
| 5,592,470 | 1/1997 | Rudrapatna et al. | 370/468 |
| 5,625,877 | 4/1997 | Dunn et al. | 370/468 |
| 5,699,356 | 12/1997 | Beever et al. | 370/329 |
| 5,818,830 | 10/1998 | Daane et al. | 370/347 |
| 5,946,633 | 8/1999 | McAlinden | 455/551 |

FOREIGN PATENT DOCUMENTS

| | | | |
|---|---|---|---|
| 0622925 | 11/1994 | European Pat. Off. | H04L 12/28 |
| 9108629 | 6/1991 | WIPO | H04J 3/24 |
| 9512257 | 5/1995 | WIPO | H04B 7/00 |
| 9524802 | 9/1995 | WIPO | H04Q 3/00 |
| 9637081 | 11/1996 | WIPO | H04Q 7/24 |
| 9638994 | 12/1996 | WIPO | H04Q 7/32 |

*Primary Examiner*—Ricky Ngo
*Attorney, Agent, or Firm*—Baker Botts, L.L.P.

[57] ABSTRACT

The present invention provides a bandwidth management system, a subscriber terminal, and a method for managing calls between a central terminal and a subscriber terminal of a wireless telecommunications system, a number of items of telecommunications equipment being connectable to the subscriber terminal. The subscriber terminal is arranged to pass call data between said items of telecommunications equipment and the central terminal via a wireless link, the wireless link being provided on a frequency channel with a predetermined maximum call data bandwidth for the transmission of said call data. The bandwidth management system comprises a bandwidth manager for maintaining in a storage information about allocation of the predetermined maximum call data bandwidth amongst calls currently being handled on the frequency channel. Further, a bandwidth allocator is provided that, responsive to a request to establish a call, is arranged to allocate, with reference to the information in said storage, a call data bandwidth for the call. The bandwidth manager then uses the call data bandwidth allocated by the bandwidth allocator to update the information in the storage. In preferred embodiments, the type of call to be established is determined, and the bandwidth allocator uses this call type information when allocating the call data bandwidth for the call. Compression may then be applied to the call data dependent on the bandwidth allocated.

29 Claims, 9 Drawing Sheets

TABLE 1

| CHANNEL<br>STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 0 |
| 2 | 0 | 0 | 0 | 0 | 0 | 0 | 0 | 0 | 0 | 0 | 0 | 0 | 0 | 0 | 0 | 1 |
| 3 | 0 | 0 | 0 | 0 | 0 | 0 | 0 | 0 | 0 | 0 | 0 | 0 | 0 | 0 | 0 | 1 |
| 4 | 0 | 0 | 0 | 0 | 0 | 0 | 0 | 0 | 0 | 0 | 0 | 0 | 0 | 0 | 0 | 1 |
| 5 | 0 | 0 | 0 | 0 | 0 | 0 | 0 | 0 | 0 | 0 | 0 | 0 | 0 | 0 | 0 | 1 |

TABLE 2

| CHANNEL<br>STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 1 | 1 | 1 | 1 | 1 | 1 | 1 | 1 | 1 | 1 | 1 | 0 |
| 2 | 0 | 0 | 0 | 0 | 0 | 0 | 0 | 0 | 0 | 0 | 0 | 0 | 0 | 0 | 0 | 1 |
| 3 | 0 | 0 | 0 | 1 | 0 | 0 | 0 | 0 | 0 | 0 | 0 | 0 | 0 | 0 | 0 | 1 |
| 4 | 0 | 0 | 0 | 1 | 0 | 0 | 0 | 0 | 0 | 0 | 0 | 0 | 0 | 0 | 0 | 1 |
| 5 | 0 | 0 | 0 | 1 | 0 | 0 | 0 | 0 | 0 | 0 | 0 | 0 | 0 | 0 | 0 | 1 |

TABLE 3 AND 4

| CHANNEL<br>STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 1 | 1 | 1 | 1 | 1 | 0 | 1 | 1 | 1 | 1 | 1 | 0 |
| 2 | 0 | 0 | 0 | 0 | 0 | 0 | 0 | 0 | 0 | 0 | 0 | 0 | 0 | 0 | 0 | 1 |
| 3 | 0 | 0 | 0 | 1 | 0 | 0 | 0 | 0 | 0 | 1 | 0 | 0 | 0 | 0 | 0 | 1 |
| 4 | 0 | 0 | 0 | 1 | 0 | 0 | 0 | 0 | 0 | 1 | 0 | 0 | 0 | 0 | 0 | 1 |
| 5 | 0 | 0 | 0 | 0 | 0 | 0 | 0 | 0 | 0 | 0 | 0 | 0 | 0 | 0 | 0 | 1 |

TABLE 5

| CHANNEL<br>STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 1 | 1 | 1 | 1 | 1 | 0 | 0 | 1 | 1 | 1 | 1 | 0 |
| 2 | 0 | 0 | 0 | 0 | 0 | 0 | 0 | 0 | 0 | 0 | 0 | 0 | 0 | 0 | 0 | 1 |
| 3 | 0 | 0 | 0 | 1 | 0 | 0 | 0 | 0 | 0 | 1 | 1 | 0 | 0 | 0 | 0 | 1 |
| 4 | 0 | 0 | 0 | 0 | 0 | 0 | 0 | 0 | 0 | 0 | 0 | 0 | 0 | 0 | 0 | 1 |
| 5 | 0 | 0 | 0 | 0 | 0 | 0 | 0 | 0 | 0 | 0 | 0 | 0 | 0 | 0 | 0 | 1 |

*FIG. 11A*

TABLE 6

| CHANNEL STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 1 | 1 | 1 | 1 | 1 | 0 | 0 | 1 | 0 | 1 | 1 | 0 |
| 2 | 0 | 0 | 0 | 0 | 0 | 0 | 0 | 0 | 0 | 0 | 0 | 0 | 0 | 0 | 0 | 1 |
| 3 | 0 | 0 | 0 | 1 | 0 | 0 | 0 | 0 | 0 | 1 | 1 | 0 | 1 | 0 | 0 | 1 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |

TABLE 7

| CHANNEL STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 1 | 0 | 1 | 1 | 1 | 0 | 0 | 1 | 0 | 1 | 1 | 0 |
| 2 | 0 | 0 | 0 | 0 | 0 | 1 | 0 | 0 | 0 | 0 | 0 | 0 | 0 | 0 | 0 | 1 |
| 3 | 0 | 0 | 0 | 0 | 0 | 1 | 0 | 0 | 0 | 0 | 0 | 0 | 0 | 0 | 0 | 1 |
| 4 | 0 | 0 | 0 | 0 | 0 | 1 | 0 | 0 | 0 | 0 | 0 | 0 | 0 | 0 | 0 | 1 |
| 5 | 0 | 0 | 0 | 0 | 0 | 0 | 0 | 0 | 0 | 0 | 0 | 0 | 0 | 0 | 0 | 1 |

TABLE 8

| CHANNEL STATE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 1 | 0 | 0 | 1 | 1 | 0 | 0 | 1 | 0 | 1 | 1 | 0 |
| 2 | 0 | 0 | 0 | 0 | 0 | 1 | 1 | 0 | 0 | 0 | 0 | 0 | 0 | 0 | 0 | 1 |
| 3 | 0 | 0 | 0 | 0 | 0 | 1 | 1 | 0 | 0 | 0 | 0 | 0 | 0 | 0 | 0 | 1 |
| 4 | 0 | 0 | 0 | 0 | 0 | 1 | 1 | 0 | 0 | 0 | 0 | 0 | 0 | 0 | 0 | 1 |
| 5 | 0 | 0 | 0 | 0 | 0 | 0 | 0 | 0 | 0 | 0 | 0 | 0 | 0 | 0 | 0 | 0 |

*FIG. 11B*

ALLOCATION OF BANDWIDTH TO CALLS IN A WIRELESS TELECOMMUNICATIONS SYSTEM

TECHNICAL FIELD OF THE INVENTION

The present invention relates to allocation of bandwidth for calls in a wireless telecommunications system, the wireless telecommunications system including a subscriber terminal that is arranged to handle calls between telecommunications equipment connected to that subscriber terminal and a central terminal connected to the subscriber terminal via a wireless link.

BACKGROUND OF THE INVENTION

A wireless telecommunications system has been proposed in which a geographical area is divided into cells, each cell having one or more central terminals (CTs) for communicating over wireless links with a number of subscriber terminals (STs) in the cell. These wireless links are typically established over predetermined frequency channels, a frequency channel typically consisting of one frequency for uplink signals from a subscriber terminal to the central terminal, and another frequency for downlink signals from the central terminal to the subscriber terminal.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

The central terminal is typically connected to a telephone network and exists to relay messages from subscriber terminals in the cell controlled by the central terminal to the telephone network, and vice versa. By this approach, an item of telecommunications equipment connected to a subscriber terminal may make an outgoing call to the telephone network, and may receive incoming calls from the telephone network. The frequency channel used for transmitting call data between the ST and the CT, and vice versa, will have a predetermined maximum bandwidth, and this limits the amount of call data that can be transmitted in a certain period of time. As an example, a typical frequency channel may be able to handle 160 kbit/s of data. This 160 kbit/s bandwidth may be used to provide two 64 kbit/s voice channels, one 16 kbit/s signalling data channel, and one 16 kbit/s overhead channel. The overhead channel is provided for carrying control information used to establish and maintain the downlink and uplink communication paths. With such an arrangement, two items of telecommunications equipment can be connected to one subscriber terminal.

With only a limited number of frequency channels being available for communications between subscriber terminals and a central terminal, techniques have been developed to enable a number of different ST to CT communications to be handled simultaneously on the same frequency channel without interfering with each other. One such technique involves the use of a "Code Division Multiple Access" (CDMA) technique, whereby a set of orthogonal codes may be applied to the data to be transmitted on a particular frequency channel, data relating to different ST to CT communications being combined with different orthogonal codes from the set. Signals to which an orthogonal code has been applied can be considered as being transmitted over a corresponding orthogonal channel within a particular frequency channel.

Whilst this increases the number of subscriber terminals that may be simultaneously in communication with a particular central terminal, given a predetermined number of frequency channels, there is still a need for a central terminal to be able to manage more calls. One approach is to seek to increase the number of items of telecommunications equipment that can be supported from a single subscriber terminal. As discussed earlier, the maximum bandwidth of the frequency channel limits the amount of data that can be handled by a single wireless link between a subscriber terminal and a central terminal, and this affects the number of items of telecommunications equipment that can simultaneously be supported by a subscriber terminal.

Compression techniques enable call data to be compressed and hence use less bandwidth. However, compression tends to reduce the quality slightly and also introduce delays as a result of the compression/decompression process. Whilst certain types of call data, such as voice data, may not be too adversely affected by these aspects of the compression/decompression process, other types of call data, such as data sent by modems, may be adversely affected, such that the delays resulting from the compression/decompression process will adversely affect the throughput of the data. Hence it is apparent that the number of items of telecommunications equipment supported by a single subscriber terminal cannot be increased merely by employing compression techniques on the data produced by the items of telecommunications equipment.

SUMMARY OF THE INVENTION

According to the present invention, there is provided a bandwidth management system for managing calls between a central terminal and a subscriber terminal of a wireless telecommunications system, a number of items of telecommunications equipment being connectable to the subscriber terminal, and the subscriber terminal being arranged to pass call data between said items of telecommunications equipment and the central terminal via a wireless link, the wireless link being provided on a frequency channel with a predetermined maximum call data bandwidth for the transmission of said call data, the bandwidth management system comprising: a bandwidth manager for maintaining in a storage information about allocation of the predetermined maximum call data bandwidth amongst calls currently being handled on the frequency channel; a bandwidth allocator, responsive to a request to establish a call, for allocating, with reference to the information in said storage, a call data bandwidth for the call; the bandwidth manager using the call data bandwidth allocated by the bandwidth allocator to update the information in the storage.

In accordance with the present invention, a bandwidth management system is provided with a bandwidth allocator for allocating call data bandwidth to calls established between the central terminal and the subscriber terminal. Each time the establishment of a call is requested, the bandwidth allocator can be used to determine the call data bandwidth to be allocated to that call. Compression may then be applied to the call data dependent on the bandwidth allocated. Information about the allocation of the maximum call data bandwidth of the frequency channel amongst the various calls currently being handled by the subscriber terminal is stored in a storage, and is accessible by the bandwidth allocator.

In preferred embodiments, the bandwidth management system further comprises a call type identifier, responsive to the request to establish a call, for determining the type of that call, the bandwidth allocator using the call type information when allocating the call data bandwidth for the call.

By this approach, the call type information can actually be used by the bandwidth allocator when determining the bandwidth to be allocated to the call. Whilst voice calls may be satisfactorily handled within a bandwidth which requires the voice data to be compressed, high speed data calls may need to be allocated a bandwidth that does not require data compression, or requires only a slight data compression. The high speed data generated by modems, faxes, etc will typically have been compressed already, and the delays resulting from any additional compression/decompression process will be unacceptable, since they will adversely affect the throughput of the data.

In preferred embodiments, the bandwidth allocator has access to priority information identifying the relative priorities of different call types, the bandwidth allocator being arranged to allocate, subject to the available bandwidth indicated by the information in the storage, calls of a higher priority call type a larger call data bandwidth than calls of a lower priority call type. Preferably, the priority information specifies a default bandwidth associated with each call type, and the bandwidth allocator is arranged to allocate to a call of a particular call type the default bandwidth associated with that call type, subject to the available bandwidth indicated by the information in the storage being sufficient to support a call of that default bandwidth.

This enables call types to be prioritised. Thus call types such as high speed data calls, which are more adversely affected by compression/decompression, can be assigned a high priority, whilst calls which are less adversely affected by compression/decompression, such as voice calls, can be assigned a lower priority. The system can then be arranged to allocate a larger bandwidth to calls of a high priority call type than to calls of a low priority call type, subject to the total allocated bandwidth not exceeding the predetermined maximum call data bandwidth.

In preferred embodiments, the default bandwidth for each call type is dependent on a service level assigned to the item of telecommunications equipment associated with that call. Thus, the end user of a particular item of telecommunications equipment may subscribe to a particular service level, and, if desired, be charged based on the service level subscribed to. For example, a user that often needs to send high speed data may subscribe to a level of service that guarantees a certain bandwidth for each call made by that user. However, a user that merely wishes to make voice calls as cheaply as possible may subscribe to a level of service where each call will be allocated a smaller bandwidth and compression will be used to handle those calls. The information about default bandwidths for call type and/or service level may in preferred embodiments be stored at the central terminal and provided to the subscriber terminal at the time that a call is established.

The system may be arranged such that, once a bandwidth has been allocated to a call, that bandwidth will be maintained for the duration of the call. However, alternatively, the bandwidth allocator, when allocating call data bandwidth for a call to be established, can alter the call data bandwidth allocated to other calls whilst those other calls are in progress. This gives the bandwidth allocator more flexibility when allocating bandwidth. For example, if a high priority call is to be established at a time when the call data bandwidth is already heavily used, the bandwidth allocator may be arranged to reduce the bandwidth available to low priority calls already in progress in order to 'free up' more bandwidth for the high priority call.

Compression circuitry to compress call data for transmission within the bandwidth allocated to a call may be provided at any suitable location prior to transmission of the call data. In preferred embodiments, the bandwidth management system comprises a compression circuit, responsive to information from the bandwidth allocator identifying the allocated call data bandwidth, for compressing the call data for the corresponding call so that the call data can be transmitted within the allocated call data bandwidth of the frequency channel.

In preferred embodiments, control and signalling data is transmitted over the frequency channel in addition to user data, and the predetermined maximum call data bandwidth managed by the bandwidth management system relates to the bandwidth available for transmission of user data. In this instance, the compression circuit is arranged only to compress the user data.

In preferred embodiments, a 'Code Division Multiple Access' (CDMA) technique is applied to signals transmitted over said frequency channel so as to create a plurality of orthogonal channels within said frequency channel, each orthogonal channel having said predetermined maximum call data bandwidth, and the bandwidth management system being arranged to manage the call data bandwidth for each orthogonal channel.

Viewed from a second aspect, the present invention provides a subscriber terminal for handling calls in a wireless telecommunications system, a number of items of telecommunications equipment being connectable to the subscriber terminal, and the subscriber terminal being arranged to pass call data between said items of telecommunications equipment and a central terminal connectable to said subscriber terminal via a wireless link, the wireless link being provided on a frequency channel with a predetermined maximum call data bandwidth for the transmission of said call data, the subscriber terminal comprising: a bandwidth manager for maintaining in a storage information about allocation of the predetermined maximum call data bandwidth amongst calls currently being handled by the subscriber terminal; a bandwidth allocator for allocating, with reference to the information in said storage, a call data bandwidth for a call, the bandwidth manager being arranged to use the call data bandwidth allocated by the bandwidth allocator to update the information in the storage; a call manager, responsive to a request to establish a call, to employ the bandwidth allocator to determine the call data bandwidth to be allocated to that call, and to then communicate with the central terminal to establish a call over the wireless link having the allocated call data bandwidth.

In preferred embodiments, an overhead channel is defined within the frequency channel for passing control information between the subscriber terminal and the central terminal, the call manager being responsive to the allocation of call data bandwidth by the bandwidth allocator to insert a bandwidth allocation signal within the overhead channel signal transmitted to the central terminal, the central terminal thereby receiving information about the call data bandwidth allocated by the bandwidth allocator.

Viewed from a third aspect, the present invention provides a method of managing calls between a central terminal and a subscriber terminal of a wireless telecommunications system, a number of items of telecommunications equipment being connectable to the subscriber terminal, and the subscriber terminal being arranged to pass call data between said items of telecommunications equipment and the central terminal via a wireless link, the wireless link being provided on a frequency channel with a predetermined maximum call data bandwidth for the transmission of said call data, the method comprising the steps of: (a) maintaining information about allocation of the predetermined maximum call data bandwidth amongst calls currently being handled on the frequency channel; (b) responsive to a request to establish a call, allocating, with reference to the information maintained at said step (a), a call data bandwidth for the call; (c) using the call data bandwidth allocated at said step (b) to update the information in the storage; and (d) establishing a call over the wireless link between the central terminal and the subscriber terminal having the allocated call data bandwidth.

BRIEF DESCRIPTION OF THE DRAWINGS

An embodiment of the invention will be described hereinafter, by way of example only, with reference to the accompanying drawings in which like reference signs are used for like features and in which.

DETAILED DESCRIPTION OF THE INVENTION

For the purpose of describing a preferred embodiment of the present invention, a subscriber terminal of a wireless telecommunications system will be described, in which, in accordance with preferred embodiments of the invention, logic is provided to enable the subscriber terminal to perform bandwidth allocation to increase the number of items of telecommunications equipment supported by that subscriber terminal.

Figure 1:
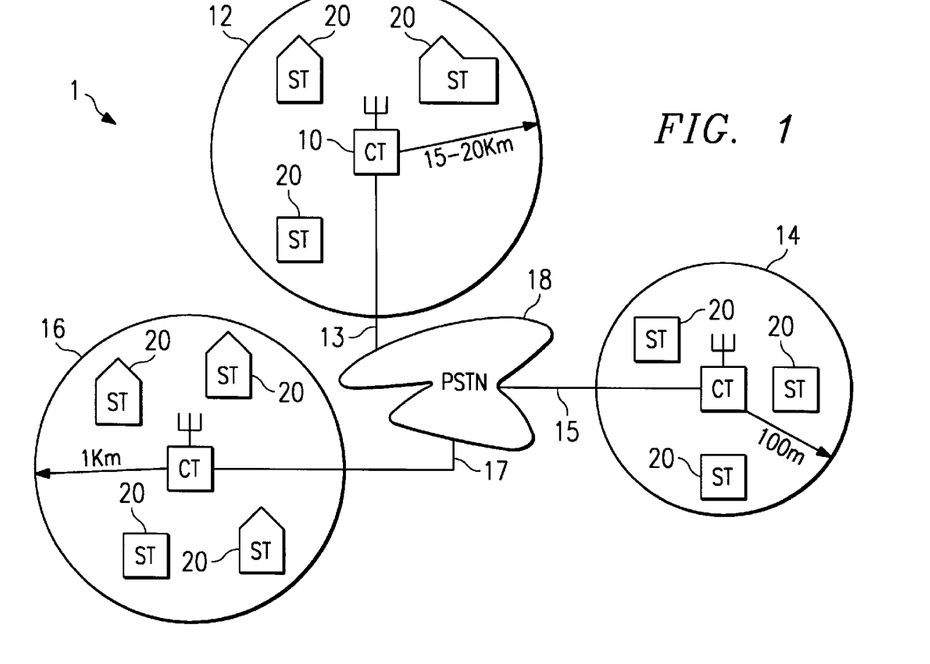
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed radio links between subscriber terminals 20 at fixed locations within a service area (e.g., 12, 14, 16) and the central terminal 10 for that service area. In one embodiment, each subscriber terminal 20 is provided with a permanent fixed access link to its central terminal 10. However, in alternative embodiments, demand-based access could be provided, so that the number of subscribers which can be serviced exceeds the number of available wireless links.

Figure 2:
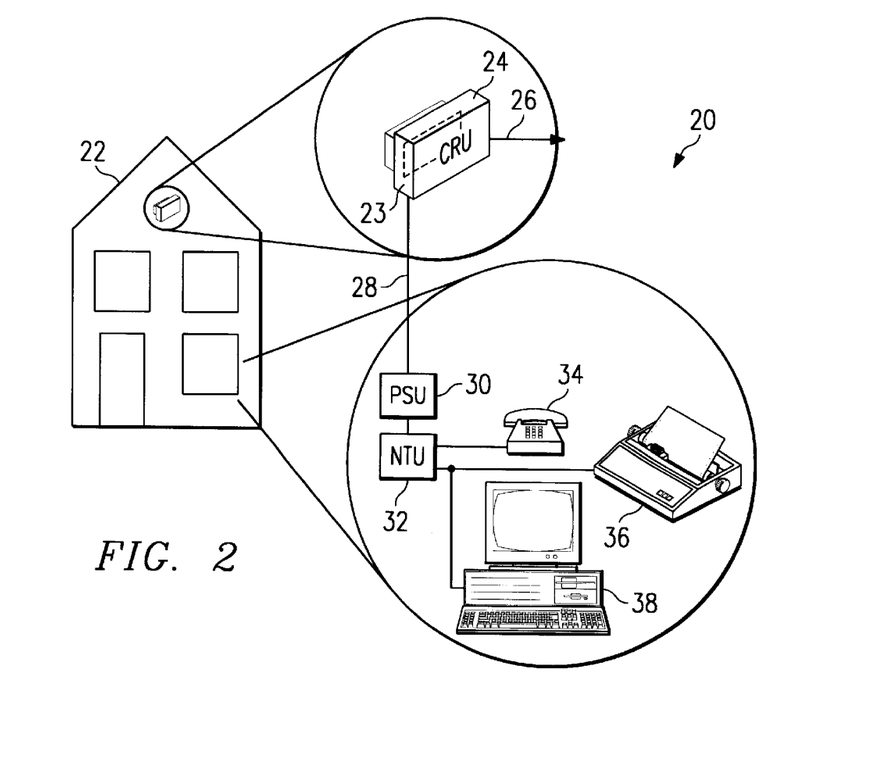
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 may, in accordance with preferred embodiments of the present invention, support a plurality of lines, so that a plurality of items of telecommunications equipment could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figures 3, 3A:
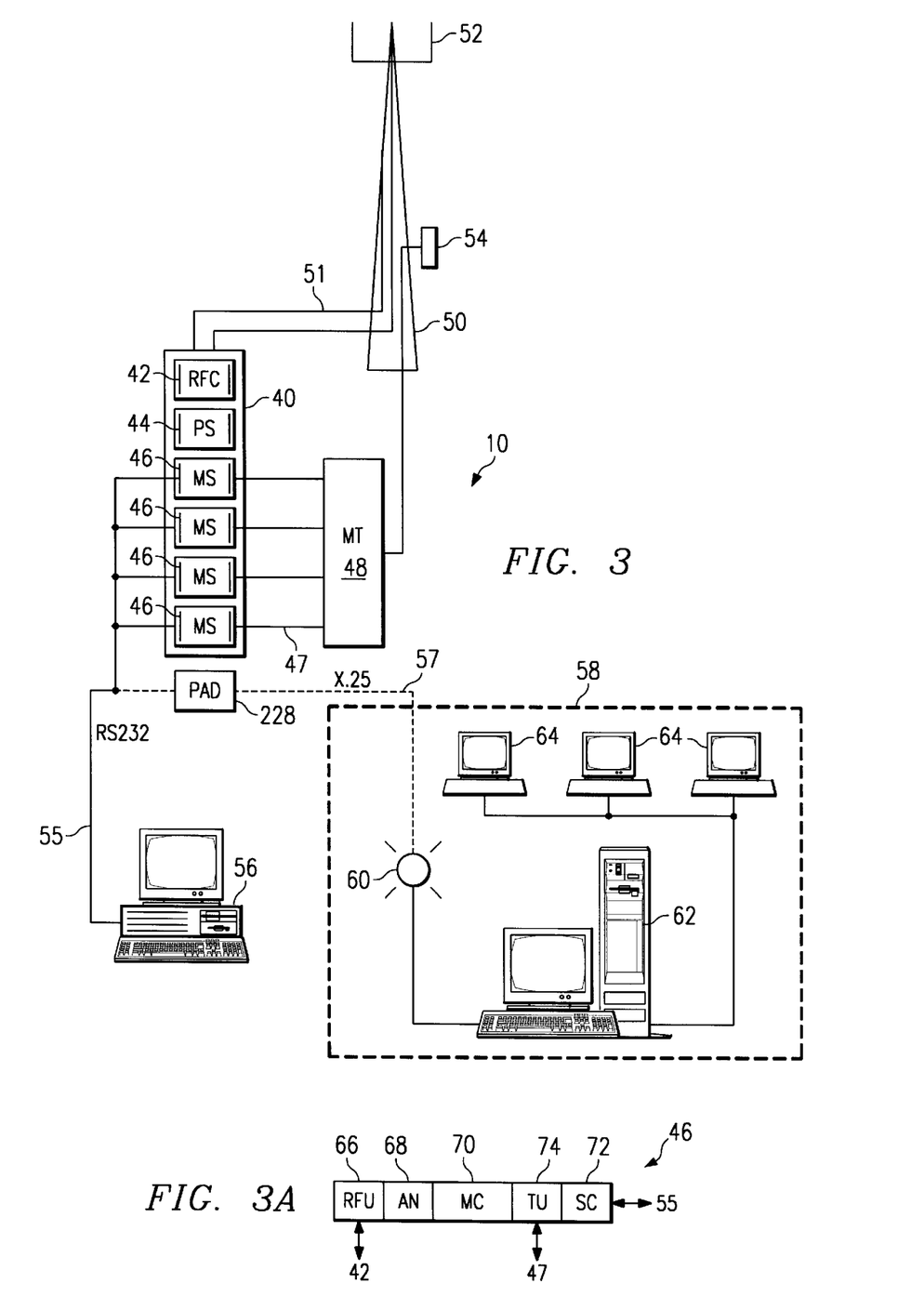
FIG. 3 is a schematic illustration of an example of a central terminal of the telecommunications system of FIG. 1.
FIG. 3A is a schematic illustration of a modem shelf of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and ×16 spreading with "Code Division Multiplexed Access" (CDMA) codes on the transmit signals, and synchronisation recovery, de-spreading and error correction on the receive signals. Each modem card 70 in the present example has two modems, and in preferred embodiments there are eight modem cards per shelf, and so sixteen modems per shelf. However, in order to incorporate redundancy so that a modem may be substituted in a subscriber link when a fault occurs, only 15 modems on a single modem shelf 46 are generally used. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to the subscriber terminals via one of 15 of the 16 modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

Figure 4:
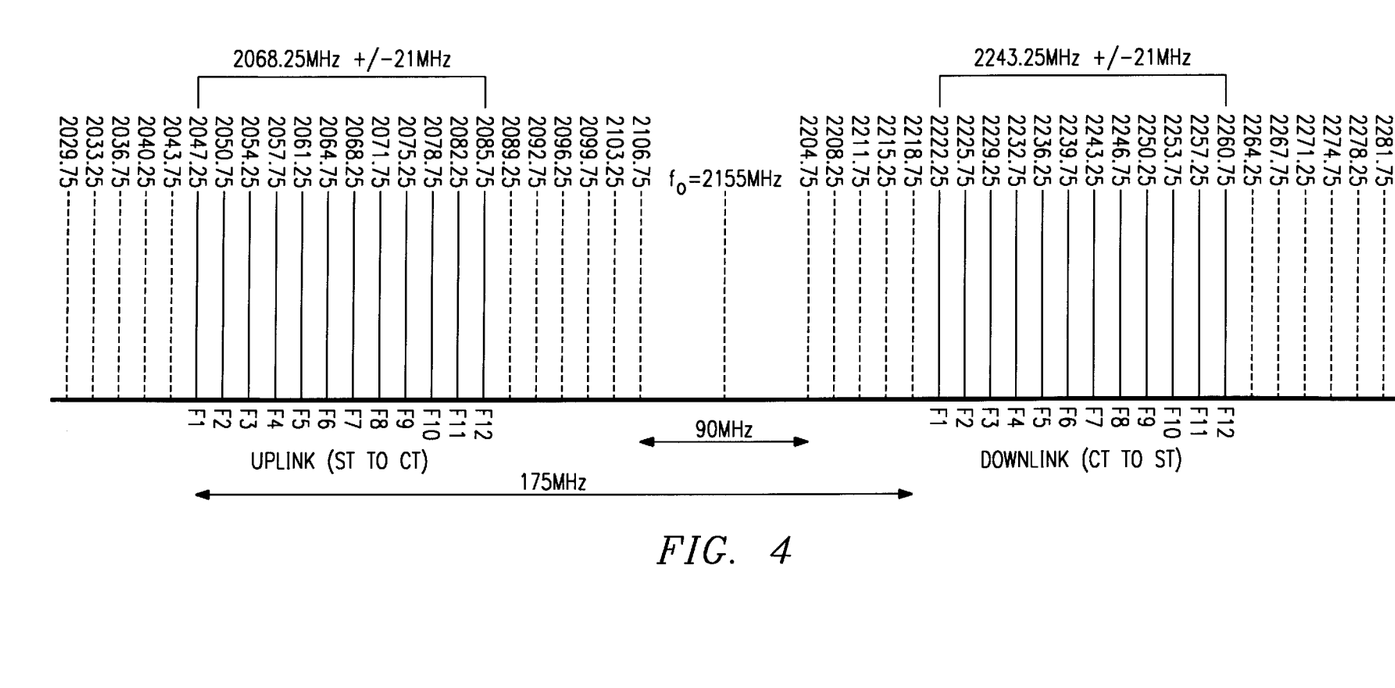
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centered about 2155 MHz. The spacing between the receive and transmit channels exceeds the required minimum spacing of 70 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

Figure 5A:
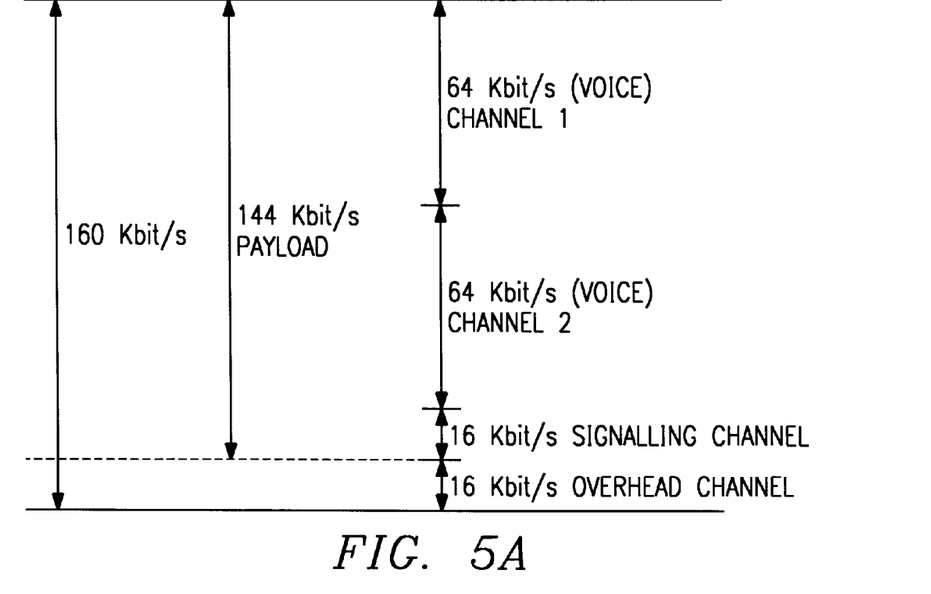
FIG. 5A illustrates a typical standard channel bandwidth allocation.

The basic wireless telecommunications system described above delivers 120×64 kbit/sec channels paired in two's to 60 subscriber/customer radio units (CRU's). This is accomplished using 4×15 160 kbit/sec radio channels. Some of the 160 kbit/sec are used for system overhead and some for ISDN signalling is also reserved. FIG. 5A illustrates this standard configuration.

Figure 5B:
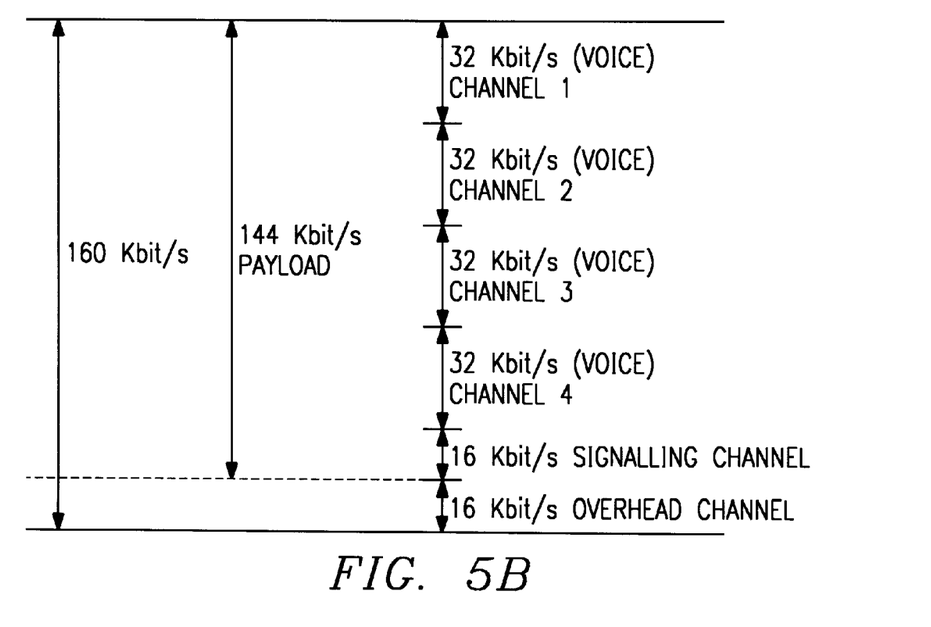
FIG. 5B illustrates a compressed channel bandwidth allocation.

Through design modification, It is possible to provide 4×32 kbit/sec compressed voice services with relatively high quality voice grade services, as illustrated in FIG. 5B. However, as explained earlier, the problem encountered when using compression is that compression reduces the quality slightly during the compression/decompression process. Therefore, for example, if a customer attempts to use a high bit rate modem device on a 32 kbit/sec channel, they will not be able to attain the equivalent throughput as a 64 kbit/sec system.

If the compression rate is higher, such as 4:1 or 8:1, the throughput is affected even further. Examples of throughput impact to a data modem call are provided in the following table:

| Channel Speed | | Compress | Modem |
|---|---|---|---|
| Actual | Ratio | Speed | Throughout |
| 64 kbit/sec | 1:1 | 28,800 bps | 28,800 bps |
| 32 kbit/sec | 2:1 | 28,800 bps~14,400 bps | |
| 16 kbit/sec | 4:1 | 28,800 bps~9,600 bps | |
| 8 kbit/sec | 8:1 | 28,800 bps~4,800 bps | |

In accordance with preferred embodiments of the present invention, this problem is alleviated by utilising the overhead channel as a means of communication from the ST CRU to the base station to provide bandwidth allocation information to the base station. This then allows the CRU the flexibility to provide bandwidth on demand to the users/devices connected to an individual CRU to attempt to provide the highest quality and most reliable connection for data modem/fax users.

To illustrate the design of the system of the preferred embodiment, a sixteen user, 8 kbit/sec compressed service CRU will be described.

Figure 6:
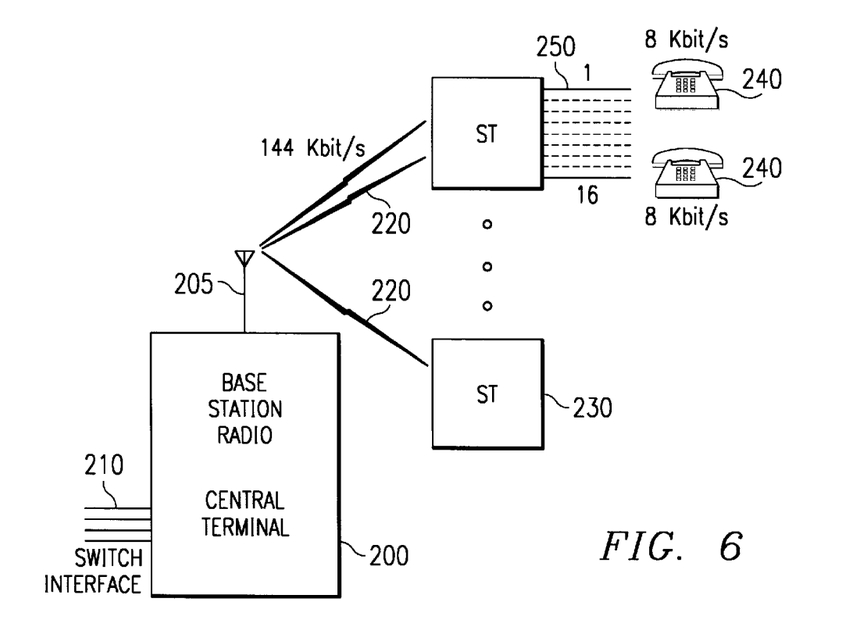
FIG. 6 illustrates a wireless telecommunications system in accordance with preferred embodiments of the present invention where bandwidth allocation is used by the subscriber terminals to support a plurality of items of telecommunications equipment.

FIG. 6 illustrates the basic arrangement of a wireless telecommunications system in accordance with the preferred embodiment. A central terminal 200 is connected via a switch interface 210 to the switch of a public switched telephone network (PSTN). An antenna 205 is provided for the transmission and reception of signals over wireless links 220. A number of subscriber terminals 230 are provided which communicate with the central terminal over the wireless links 220. Assuming the central terminal has a structure similar to that shown in FIG. 3, and hence has four modem shelves, each with fifteen active modems, then in a fixed assignment system up to sixty (60) subscriber terminals 230 may be provided which can communicate with the central terminal 200 via the wireless links 220. However, in a demand assignment configuration, there will typically be even more subscriber terminals, since in such demand assignment systems, there are usually provided more subscriber terminals than there are wireless links, and a wireless link is assigned to a particular subscriber terminal at the time that a call is associated with that subscriber terminal.

Whether the wireless telecommunications system is operating in a fixed assignment mode or a demand assignment mode, then in accordance with preferred embodiments of the present invention, up to sixteen items of telecommunications equipment 240 may be supported by lines 250 from a single subscriber terminal 230, assuming 8 Kbit/s compression is applied to the signals generated by those items of telecommunications equipment. A bandwidth allocation technique is then employed, preferably within the subscriber terminal, to allocate the available bandwidth amongst the calls to and from the connected items of telecommunications equipment 240. As illustrated in FIGS. 5A and 5B, each orthogonal channel has a payload of 144 Kbit/s of which 16 Kbit/s is allocated to a signalling channel, and the remaining 128 Kbit/s may be used for traffic channels that carry user data.

Figure 7:
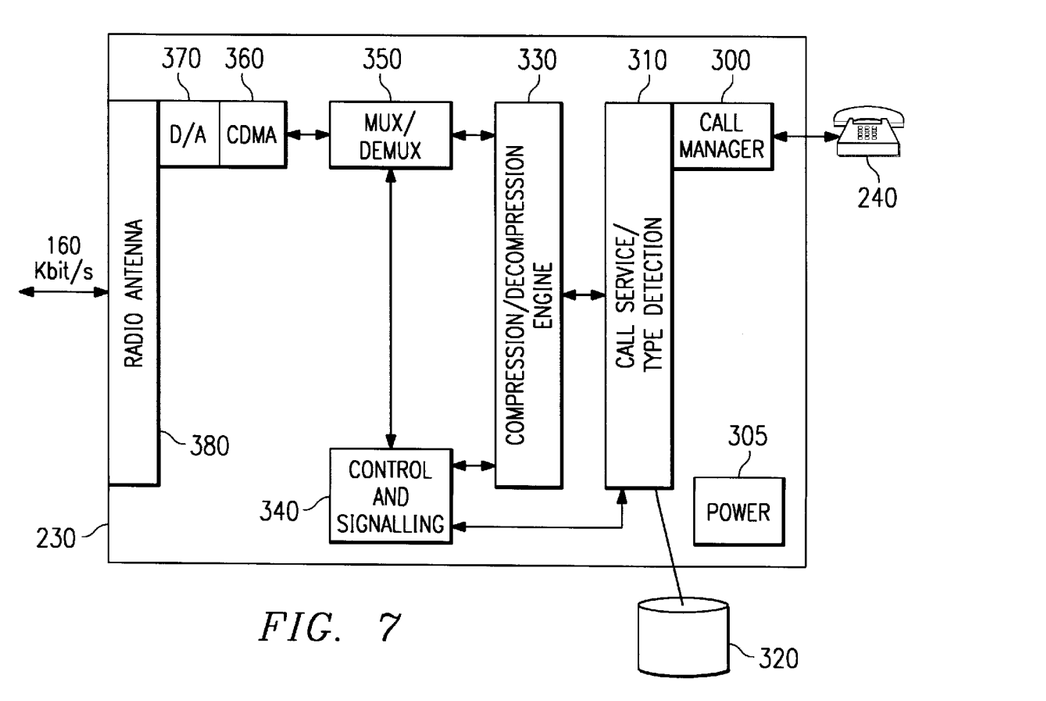
FIG. 7 illustrates the main functional elements provided within a subscriber terminal in accordance with preferred embodiments of the present invention.

FIG. 7 is a block diagram illustrating the main functional elements provided within a subscriber terminal 230 in accordance with preferred embodiments of the present invention, in order to perform bandwidth allocation for calls to and from the items of telecommunications equipment 240 connected to that subscriber terminal. The subscriber terminal 230 is provided with a call manager 300, which is arranged to detect the onhook and offhook status of the items of telecommunications equipment 240 connected to the subscriber terminal 230. For the sake of clarity, only one item of telecommunications equipment 240 is illustrated in FIG. 7. However, it will be appreciated that there may be up to sixteen items of telecommunications equipment 240 connected to the call manager 300 of the subscriber terminal 230, as was discussed earlier with reference to FIG. 6.

When the call manager 300 detects that one of the items of telecommunications equipment 240 has gone offhook, then in accordance with known procedures, the call manager 300 establishes a clear path to the PSTN switch via the central terminal. The exact mechanism used to establish the clear path is not important for the purpose of discussing the preferred embodiment of the present invention. However, for a more detailed discussion of the establishment of communication paths in a fixed assignment wireless telecommunications system, the reader is referred to International patent application WO-A-96/38930. For a detailed description of a technique which may be used in a demand assignment wireless telecommunications system to establish a wireless link, the reader is referred to UK patent application No. 9626588.9.

Upon detection of the offhook condition, the call manager 300 notifies the call service/type detection logic 310 which is used to manage bandwidth allocation over the wireless link between the subscriber terminal and the central terminal. This call detection logic 310 is arranged to detect certain tones issued by the items of telecommunications equipment 240, and to determine the call type on the basis of those detected tones. For example, a fax machine will issue a guard tone, and a modem similarly will generate a carrier tone. The presence of these tones can be detected by the call detection logic 310, which upon detection of such tones will determine that the call is of a "data" call type. If no such tones are detected, then the call detection logic 310 will assume that the call is of a "voice" call type.

Information identifying default bandwidths associated with particular call types may be provided to the subscriber terminal 230, and used by the call detection logic 310 to determine the default bandwidth to be associated with the detected call. The default bandwidths associated with particular call types may actually be dependent on the service level subscribed to by the user of the telecommunications equipment 240 involved in the call. This information may be maintained in a table within the central terminal and updated by the service provider. When a call is to be established, the appropriate default bandwidth information dependent on the service level assigned to the telecommunications equipment 240 can be provided from the central terminal to the subscriber terminal via the overhead channel. These default bandwidths will then be used by the call detection logic when allocating bandwidth to the call.

The call detection logic 310 is also responsible for maintaining in the storage 320 information about the allocation of the maximum call data bandwidth amongst calls currently being handled on the particular wireless link established by the call manager 300. Hence, taking the earlier discussed example where each orthogonal channel has 128 Kbit/s available for user data, the information in the storage will identify how much of that 128 Kbit/s is already being used for calls between the items of telecommunications equipment 240 and the central terminal 200.

Assuming that the call detection logic 310 determines, after reference to the information in the storage device 320, that the available bandwidth exceeds the default bandwidth of the call, then the call detection logic 310 may be arranged to allocate the default bandwidth to that call, and to update the information in the storage 320 accordingly. Hence, in one embodiment, a data call type may have a default bandwidth of 64 Kbit/s, whilst a voice call type may have a default bandwidth of 8 Kbit/s. Assuming there is sufficient available bandwidth, then the call detection logic 310 may be arranged to allocate a 64 Kbit/s channel for a data call, or an 8 Kbit/s channel for a voice call. Alternatively, the call detection logic 310 may be arranged such that, if there is a 64 Kbit/s channel available, then the call is initially given that 64 Kbit/s channel irrespective of whether it is a data call or a voice call. As will be discussed later, the call detection logic may in such cases be provided with the ability to reduce the bandwidth of a call in progress later on if new calls need to be established.

Once the call detection logic 310 has allocated a bandwidth to the call, then the compression/decompression engine 330 is notified of the bandwidth that has been allocated. User data generated by the item of telecommunications equipment 240 is then passed via the compression/decompression engine 330, where it is compressed as necessary to enable the user data to be transmitted within the allocated bandwidth. It will be appreciated by those skilled in the art that there are a number of suitable compression/decompression techniques which may be used, and these well known techniques will not be discussed in more detail herein.

Control and signalling logic 340 is also notified of the bandwidth allocated by the call detection logic 310, and is further connected to the compression/decompression engine 330 in order to synchronise the output of the compression/decompression engine 330 with the output of the control and signalling logic 340. The control and signalling logic 340 is arranged to receive the control and signalling information placed within the overhead channel and signalling channel, respectively. As already mentioned, the signals within these two channels are not subject to compression, and are hence are not passed through the compression/decompression engine.

A multiplexer 350 is arranged to receive the output from the control and signalling logic 340 and from the compression/decompression engine 330, and here the overhead channel, signalling channel and compressed user channels are multiplexed together.

Then, in accordance with the usual CDMA technique, the output from the multiplexer 350 has appropriate CDMA codes applied to it at the CDMA stage 360, and the resultant signal is passed through a D/A converter 370. The output from the D/A converter 370 is then passed to the radio/antenna stage 380, where it is transmitted over the wireless link as a 160 Kbit/s signal.

Figure 8:
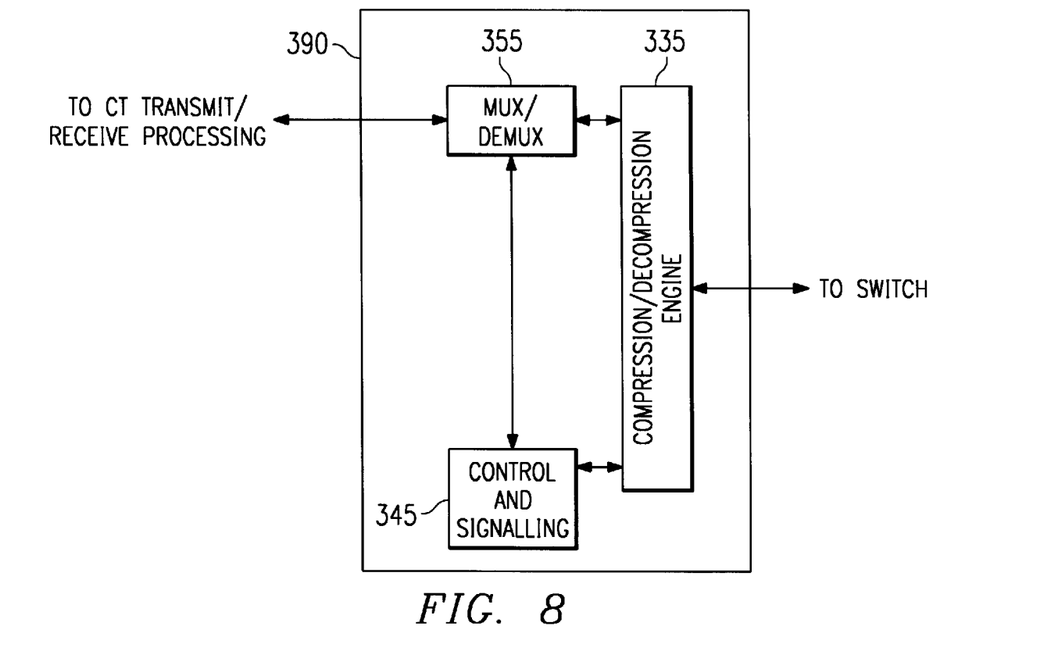
FIG. 8 illustrates the functional elements added at the switch side of the wireless link in accordance with preferred embodiments of the present invention.

When the signal is received by the central terminal 200, it is processed in the usual manner. Hence, based on the CDMA code applied to the signal, the signal is directed to a particular modem on a modem shelf within the central terminal and is then processed prior to being output to the public switched telephone network. At some suitable point before the signal reaches the switch of the public switched telephone network, the compressed signals needs to be decompressed. FIG. 8 illustrates the main function elements of a system 390 used to form this decompression. The system 390 may be provided within the central terminal 200, or alternatively may be provided as a separate entity between the central terminal 200 and the switch.

As illustrated in FIG. 8, the received signal, after being processed by the central terminal, is output to a demultiplexer 355 within the system 390. Here, the overhead and signalling channels are extracted from the received signal, and passed to the control and signalling logic 345. The remaining user data is then passed through the decompression engine 335 where it is decompressed. The control and signalling logic 345 is connected to the decompression engine 335, and, as will be discussed in more detail later, bandwidth allocation information inserted into the overhead channel by the subscriber terminal is used by the control and signalling logic 345 to determine the decompression to be applied to the user data by the decompression engine 335. The user data is then output in its decompressed form to the switch.

The structures illustrated in FIGS. 7 and 8 are used not only for outgoing calls from the items of telecommunications equipment 240, but also for incoming calls to the items of telecommunications equipment 240. In accordance with known procedures, the call manager 300 within the subscriber terminal 230 is arranged to listen on a predetermined channel for signals from the central terminal indicating that an incoming call is directed to one of the items of telecommunications equipment 240 connected to that subscriber terminal 230. As is known, upon receipt of such a signal, the call manager is used to establish clear uplink and downlink communication paths between the subscriber terminal and the central terminal to enable call data to be passed between the switch and the item of telecommunications equipment.

As with an outgoing call, the call detection logic 310 is also used to allocate bandwidth upon detection of an incoming call. Information about the bandwidth allocated is inserted on the overhead channel so that this information is available to the central terminal, and ultimately to the system 390 required to perform compression and decompression on signals to and from the item of telecommunications equipment 240. Once the system 390 has the information about the bandwidth allocated, then compression engine 335 can be used to compress user data prior to its transmission to the subscriber terminal 230. The multiplexer 355 can then be used to multiplex the compressed user data with the data for the overhead and signalling channels, the overhead and signalling information being generated locally within the system 390.

Upon receipt of the compressed signal by the subscriber terminal 230, then the signal is passed through the stages 380, 370 and 360 prior to being passed to the demultiplexer 350. Here the overhead and signalling channel information is extracted and passed to the control and signalling logic 340. The remaining compressed user data is passed to the compression/decompression engine 330, where it is decompressed. The decompressed user data is then passed to the appropriate connected item of telecommunications equipment 240.

In preferred embodiments, the power required to operate all of the elements illustrated in FIG. 7 is provided from a single unitary power supply 305. However, it will appreciated that separate power supplies may be provided for certain elements within the subscriber terminal.

Figure 9:
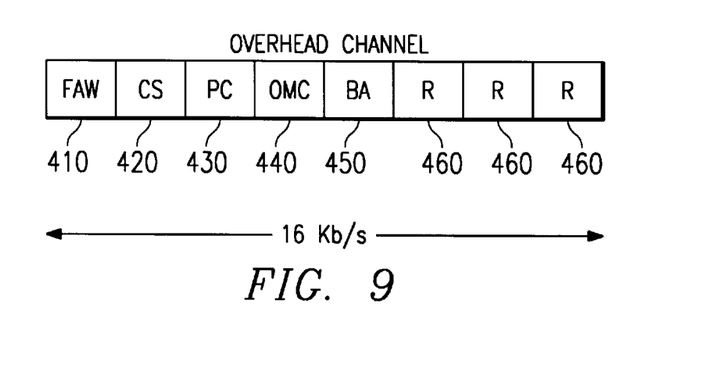
FIG. 9 illustrates how a bandwidth allocation signal may be inserted in to the overhead channel in accordance with preferred embodiments of the present invention.

FIG. 9 illustrates the signals that may typically be provided within the overhead channel in accordance with preferred embodiments of the present invention. The overhead channel preferably has a bandwidth of 16 Kbit/s, and carries control information used to establish and maintain the downlink and uplink communication paths. The overhead channel in preferred embodiments includes eight byte-sized fields, these fields containing a frame alignment word 410, a code synchronisation signal 420, a power control signal 430, an operations and management channel signal 440, three reserved byte fields 460, and, in accordance with preferred embodiments of the present invention, a bandwidth allocation signal 450.

The frame alignment word 410 identifies the beginning of the frame position for its corresponding frame of information. Code synchronisation signal 420 provides information to control synchronisation of the transmitter within the subscriber terminal to the receiver within the central terminal. Power control signal 430 provides information to control the transmitting power of the transmitter within the subscriber terminal. Operations and maintenance channel signal 440 provides status information with respect to the downlink and uplink communication paths and a path from the central terminal to the subscriber terminal which the communication protocol which operates on the modem shelf between the shelf controller and the modem cards also extends. In Demand Assignment systems, one of the reserved byte fields may be used for a channel identifier signal which is used to uniquely identify a CDMA orthogonal channel, this channel identifier signal being used by the subscriber terminal to ensure that the correct channel has been acquired.

In accordance with preferred embodiments of the present invention, a bandwidth allocation signal 450 is also included within the overhead channel. The bandwidth allocation signal 450 is a signal which identifies how the 128 Kbit/s bandwidth available for user data has been allocated.

Figure 10:
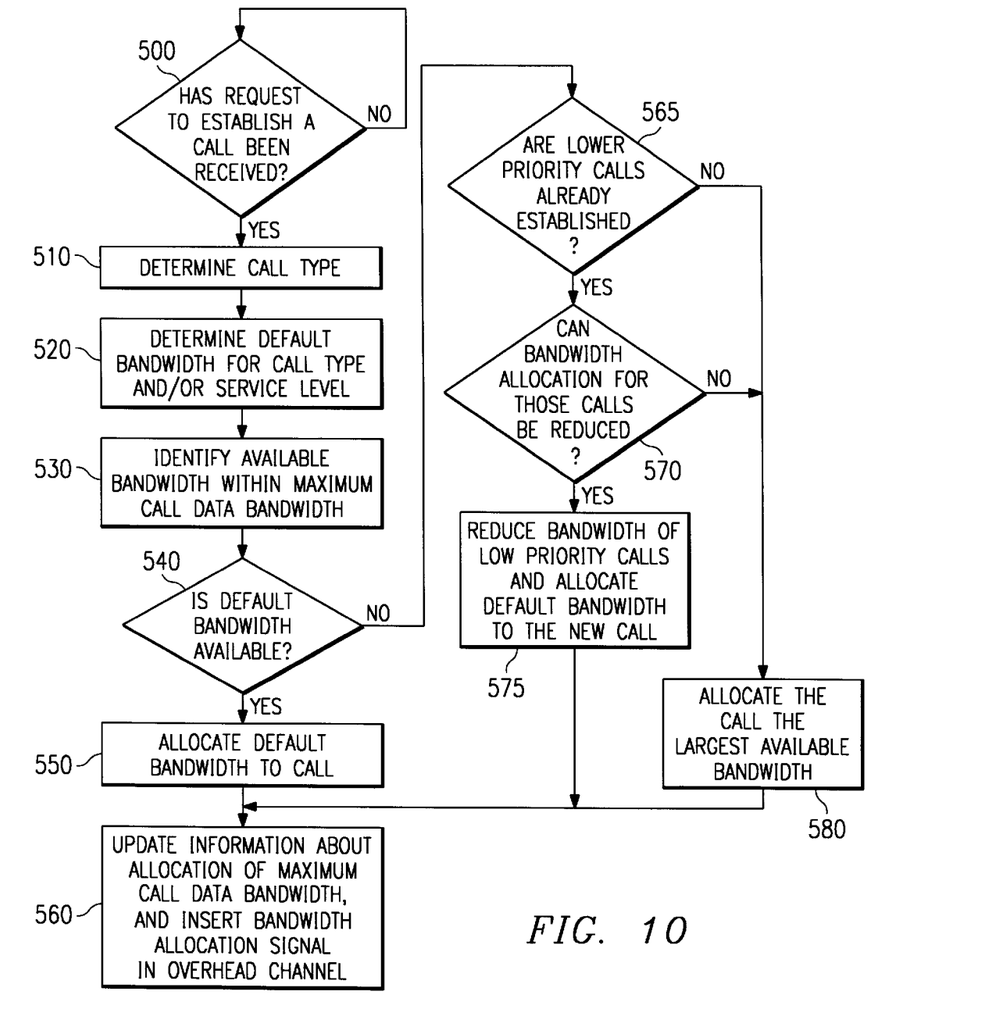
FIG. 10 is a flow diagram of the bandwidth allocation process employed in preferred embodiments of the present invention.

FIG. 10 is a flow diagram illustrating the process performed in one preferred embodiment of the present invention in order to allocate bandwidth for calls passed over a wireless link between the subscriber terminal and the central terminal. At step 500, the bandwidth management system, preferably provided by the call detection logic 310, determines whether a request to establish a call has been received. If it has, then the call type associated with that call is determined at step 510. Further, based on information received, in preferred embodiments from the central terminal, concerning the default bandwidths for the applicable service level, the default bandwidth associated with the detected call type is determined at step 520.

Further, at step 530, the information within the storage 320 identifying how the maximum call data bandwidth has been allocated amongst the ongoing calls is used to identify the available bandwidth that may be allocated by the bandwidth management system. At step 540 it is determined whether the available bandwidth exceeds the default bandwidth determined at step 520. If it does, then at step 550 the default bandwidth may be allocated to the call. Next, at step 560, the new bandwidth allocation information is used to update the information in storage 320 concerning the allocation of the maximum call data bandwidth. Further, the bandwidth allocation signal within the overhead channel is altered to reflect the new bandwidth allocation.

An alternative allocation approach which may be used when the maximum call data bandwidth is only being lightly used, and hence the available bandwidth is large, is to initially allocate a call a large bandwidth, eg 64 Kbit/s, and to then reduce that bandwidth later if the amount of traffic to be supported by the subscriber terminal increases. As discussed later, there are a number of different ways of handling the allocation process.

However, returning to the embodiment illustrated in FIG. 10, if, at step 540, it was determined that the default bandwidth cannot be accommodated within the available bandwidth, then at step 565, it is determined whether there are any lower priority calls already in progress. If there are, then at step 570, it is determined whether the bandwidth allocation for those calls can be reduced. For example, if a voice call is currently using 32 or 64 Kbit/s bandwidth, then it is possible to reduce the bandwidth of the voice call to either 8 or 16 Kbit/s in order to "free up" some bandwidth for use by the higher priority call. If the bandwidth of the lower priority calls can be reduced, then at step 575 the bandwidth of those low priority calls is reduced, and the default bandwidth is then allocated to the new call. The process then proceeds to step 560 where the information in storage 320 about the allocation of the maximum call data bandwidth is updated, and the bandwidth allocation signal in the overhead channel is altered accordingly.

If, at step 565, it is determined that there are no lower priority calls already established, or at step 570 it is determined that the bandwidth allocation for any lower priority calls cannot be reduced, then the process moves to step 580, where the call is allocated the largest available bandwidth. For example, if a data call has a default bandwidth of 64 Kbit/s, but other data calls are already in progress, such that the only available bandwidth is 32 Kbit/s, then this new data call will be allocated 32 Kbit/s. It will be appreciated by those skilled in the art that an alternative approach is to decide not to establish the call until 64 Kbit/s bandwidth becomes available.

The process then proceeds to step 560, where information in storage 320 about the allocation of the maximum call data bandwidth is updated, and the bandwidth allocation signal in the overhead channel is altered accordingly.

Based on the above description, it is apparent that, in accordance with preferred embodiments, a subscriber terminal is adapted to perform bandwidth allocation by the addition of a compression engine as well as a call detection subsystem. The functionality and decision making process is based on a predetermined set of rules and status tables, which may be altered dependent on the relative priorities between the various call types. The following description illustrates a set of rules that may be used to perform bandwidth allocation in accordance with a preferred embodiment in order to set the current state of the subscriber unit. These states are communicated over the 16 Kbit/s overhead channel as discussed earlier.

"Normal state" is when all users are allocated 8 kbit/sec, giving sixteen channels for connections to items of telecommunications equipment. Each channel can then have up to five states:

1. Hook Status (φ=offhook, 1-onhook)
2. Call type (φ=voice, 1=data)
3. Level 1 status (φ=off, 1=16 kbit allocated)
4. Level 2 status (φ=off, 1=32 kbit allocated)
5. Level 3 status (φ=off, 1=64 kbit allocated)

If a channel is at level 1 or above, there must be other channels disabled in the management/logic of the CRU so that the total payload bandwidth of 128 kbit user channels +16 kbit signalling channel is properly managed. Depending on the granularity of the air interface, then the central terminal will have to ensure that proper call management is occurring so that the total channel bandwidth is correctly managed. Hence, for example, if the granularity of the air interface is 32 Kbits, and 16 Kbits is assigned to a first call from a particular ST, then in preferred embodiments, the second 16 Kbits is only available to an item of telecommunications equipment connected to the same ST.

Consider the following example, in which it is assumed that the system does not employ different service levels, and in which all calls are initially given the maximum bandwidth available at the time of the call. In this example, users 1–15 are initially on hook with no data calls in progress. Then, user 16 makes a call. The following steps then take place:

Step 1

The CRU first determines if the call is voice or data. If the call is data, the system checks the states of the other 15 user channels and the base station for permission to allocate more bandwidth.

A decision is then made as to what level of services to grant the user and reserves that bandwidth, flagging the other affected channel users.

Figure 11A:
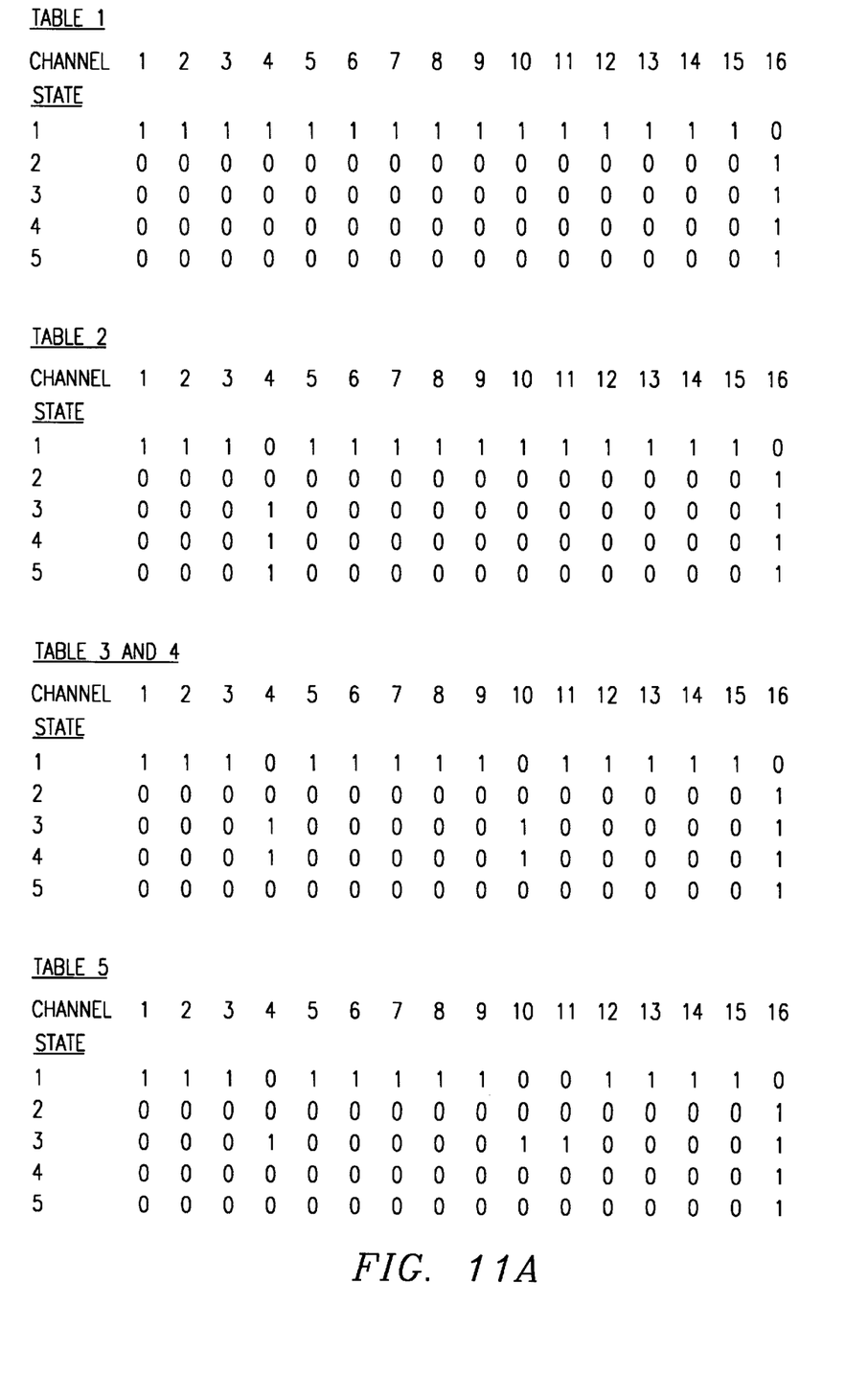
FIGS. 11A–B provide a number of state tables for an example deployment in accordance with preferred embodiments of the present invention.

An example state table of a 28,800 modem user calling on channel 16 is reproduced in FIG. 11A as Table 1. As is evident from the table, a full 64 kbit channel has been provided. As discussed earlier, this is preferable for a high bit rate modem device, since the compression necessary to pass such data over a smaller bandwidth channel would adversely affect the throughput.

Steps 2, 3, 4

For the purpose of illustration, it will now be assumed that users 4, 10, 11 and 13, in that order, pick up phones for normal voice calls. Allocation of bandwidth is then provided on a first come first served basis.

In accordance with this preferred embodiment, channel 4 would first be allocated the second 64 kbit service. This state is illustrated in Table 2 of FIG. 11A. When channel 10 picks up the phone, the CRU divides the voice allocations in two so that Channels 4 & 10 get 32 kbit per second. Since Channel 16 is a data call, it received priority and is unchanged. This state is illustrated in Table 3 & 4 of FIG. 11A.

Step 5

When channel 11 picks up the phone, channels 4 and 10 are reduced to 16 kbit/sec and channel 11 is allocated 16 kbit/sec. Again the data call on channel 16 is unaffected. This state is illustrated in Table 5 of FIG. 11A.

Step 6

When channel 13 picks up the call, it is simply allocated the open 16 kbit/sec. The data call remains unaffected. This state is illustrated in Table 6 of FIG. 11B.

Step 7

Now assume channel 6 picks up a call which is detected as data. In the preferred embodiment, the system switches all the voice calls to 8 kbit/sec. This frees up 32 kbit/sec which can be allocated to this new user. The original data user continues at 64 kbit/sec. This state is illustrated in Table 7 of FIG. 11B.

Step 8

Now assume channel 7 adds a data call. Channel 16 is reduced to 32 kbit/sec and channel 7 gets the 32 kbit/sec remaining. This state is illustrated in Table 8 of FIG. 11B.

In the above described preferred embodiment, the priority for channel allocations are:
A) Data has priority over voice
B) Reduction in voice grade from 64 kbit/sec to 32 kbit/sec to 16 kbit/sec to 8 kbit/sec
C) Same as B for data service Incoming calls will be managed in the same manner as outgoing calls, however, incoming calls will preferably be assigned the highest compression level first as incoming call type may not be detectable.

As calls are terminated and bandwidth becomes available, the system will preferably allocate the available bandwidth to the first data user in the state table, not necessarily the largest existing data caller. Once data caller bandwidth is maximised, the system can be arranged to provide voice callers with additional bandwidth. This ensures maximum system flexibility.

In preferred embodiments, a secondary state table may be provided in the Base Station which is programmable by the service provider. The above description has described a system which attempts to maximise bandwidth allocation. The problem with this operation is that:
a) users get variable service levels for free;
b) the changes in service may not be tolerated by some users;
c) some users will never use data services;
d) some users will be willing to pay more to be guaranteed higher levels of services if available at time a call is placed.

With this in mind, there are a number of possible manners in which the bandwidth allocation service could be provided, based on the following considerations:
1) Maximum flexibility/no service level billing;
2) Fixed voice levels, maximum data flexibility with no service level billing;
3) Priority voice level service (this would include data);
4) Priority data level service;
5) Fixed channel assignment—bandwidth allocation option disabled.

This state shall be settable at the modem shelf level as mixed services with ISDN, DIGITAL DATA (D128) are currently not permitted on the same base station modem shelf.

The base station will then provide an additional state in the on-hook to off-hook status message indicating the level of service provided. This status message can be passed via management systems to the billing centre for proper cost accounting.

Figure 11B:
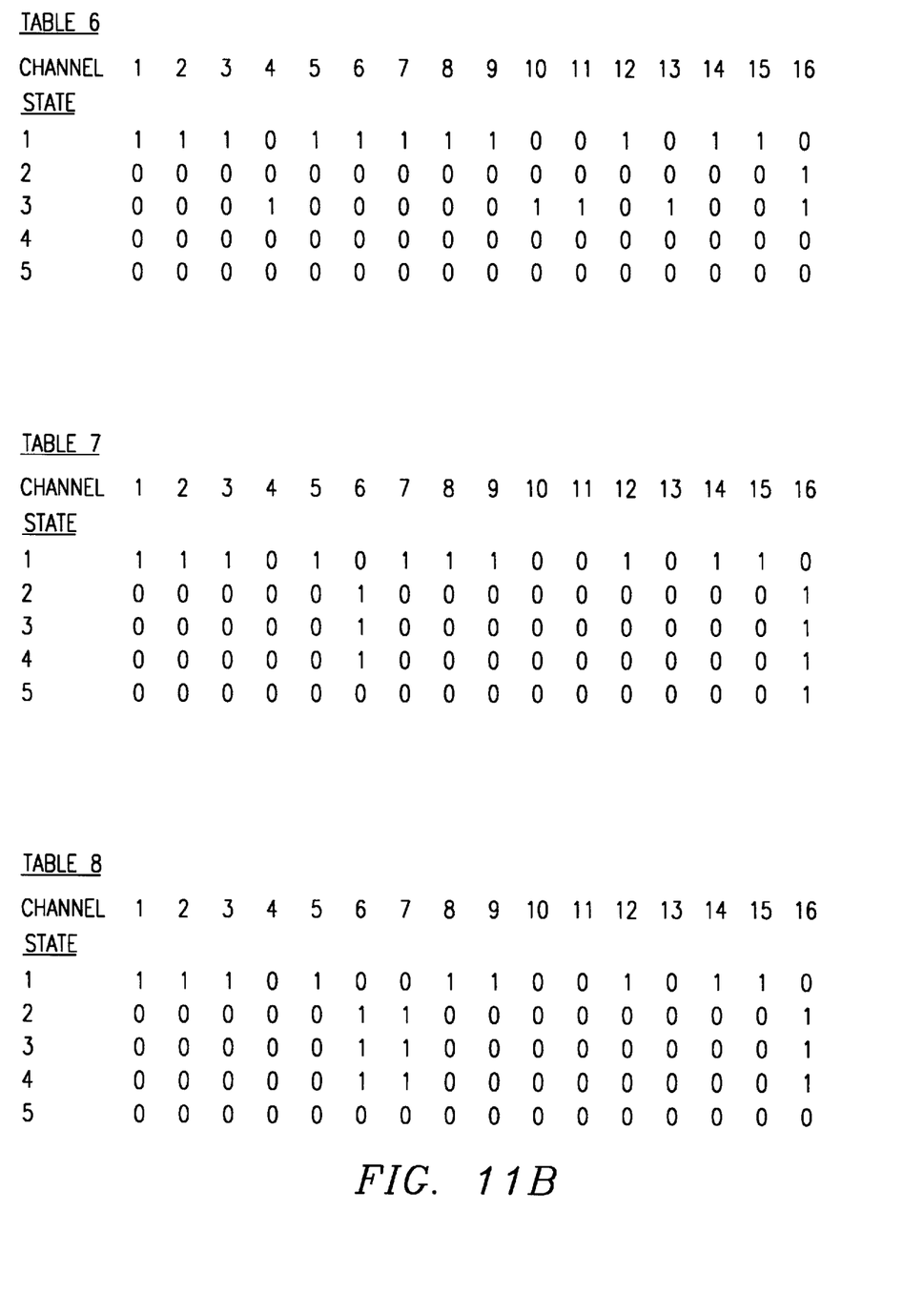

If it is desired to alter the above described operation, to provide fixed voice levels, whilst retaining maximum flexibility for data channels, then the following changes are required to the earlier described process discussed with reference to steps 1 to 8 and FIGS. 11A–B:
1. All outgoing voice calls are automatically provided the highest level of compression (i.e. 8 kbit/sec);
2. The only management occurs for data calls.

If it is desired to provide for priority voice level service, then the following changes are required to the earlier described process discussed with reference to steps 1 to 8 and FIGS. 11A–B:
1. Users assigned this setting are given the guaranteed priority over a) data callers and b) other voice callers.
2. It is possible to set the minimum service level for these callers as 64, 32, 16 or 8 kbit/sec at time of placement of outgoing call. This bandwidth will be booked and not changed. This may disable other callers from making calls.

If a priority data level service is to be provided, then the data setting is used instead of voice. Voice calling would operate as described earlier with reference to steps 1 to 8 and FIGS. 11A–B.

Any of the above described bandwidth allocation functionality can be disabled to prevent the system from altering channel bandwidth allocation, the system then reverting to the standard wireless system with 2×64 kbits/sec channels.

All of the above settings are preferably arranged to be queriable and settable via management systems.

From the above description, it will be apparent that the system of the preferred embodiment enables dynamic bandwidth allocation to take place on a CDMA Wireless platform. Further, it may be arranged to continually monitor and adjust the channel allocation as necessary. Also, it can be arranged to provide the possibility for adjusted billing levels as a revenue driver for service providers. The system of the preferred embodiment may be implemented within a fixed assignment or a demand assignment environment.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A bandwidth management system for managing calls between a central terminal and a subscriber terminal of a wireless telecommunications system, a number of items of telecommunications equipment being connectable to the subscriber terminal, and the subscriber terminal being arranged to pass call data between said items of telecommunications equipment and the central terminal via a wireless link, the wireless link being provided on a frequency channel with a predetermined maximum call data bandwidth for the transmission of said call data, the bandwidth management system comprising:

a bandwidth manager for maintaining in a storage information about allocation of the predetermined maximum call data bandwidth amongst calls currently being handled on the frequency channel;

a bandwidth allocator, responsive to a request to establish a call, for allocating, with reference to the information in said storage, and wherein a call data bandwidth for the call;

the bandwidth manager using the call data bandwidth allocated by the bandwidth allocator to update the information in the storage.

2. A bandwidth management system as claimed in claim 1, further comprising a call type identifier, responsive to the request to establish a call, for determining the type of that call, the bandwidth allocator using the call type information when allocating the call data bandwidth for the call.

3. A bandwidth management system as claimed in claim 2, wherein the bandwidth allocator has access to priority information identifying the relative priorities of different call types, the bandwidth allocator being arranged to allocate, subject to the available bandwidth indicated by the information in the storage, calls of a higher priority call type a larger call data bandwidth than calls of a lower priority call type.

4. A bandwidth management system as claimed in claim 3, wherein the priority information specifies a default bandwidth associated with each call type, and the bandwidth allocator is arranged to allocate to a call of a particular call type a default bandwidth associated with that call type, subject to the available bandwidth indicated by the information in the storage being sufficient to support a call of that default bandwidth.

5. A bandwidth management system as claimed in claim 4, wherein the default bandwidth for each call type is dependent on a service level assigned to the item of telecommunications equipment associated with that call.

6. A bandwidth management system as claimed in claim 1, wherein the bandwidth allocator, when allocating call data bandwidth for a call to be established, can alter the call data bandwidth allocated to other calls whilst those other calls are in progress.

7. A bandwidth management system as claimed in claim 1, further comprising a compression circuit, responsive to information from the bandwidth allocator identifying the allocated call data bandwidth, for compressing the call data for the corresponding call so that the call data can be transmitted within the allocated call data bandwidth of the frequency channel.

8. A bandwidth management system as claimed in claim 7, wherein control and signalling data is transmitted over the frequency channel in addition to user data, the predetermined maximum call data bandwidth managed by the bandwidth management system relating to the bandwidth available for transmission of user data, and the compression circuit being arranged only to compress the user data.

9. A bandwidth management system as claimed in claim 1, wherein a Code Division Multiple Access (CDMA) technique is applied to signals transmitted over said frequency channel so as to create a plurality of orthogonal channels within said frequency channel, each orthogonal channel having said predetermined maximum call data bandwidth, and the bandwidth management system being arranged to manage the call data bandwidth for each orthogonal channel.

10. A subscriber terminal for handling calls in a wireless telecommunications system, a number of items of telecommunications equipment being connectable to the subscriber terminal, and the subscriber terminal being arranged to pass call data between said items of telecommunications equipment and a central terminal connectable to said subscriber terminal via a wireless link, the wireless link being provided on a frequency channel with a predetermined maximum call data bandwidth for the transmission of said call data, the subscriber terminal comprising:

a bandwidth manager for maintaining in a storage information about allocation of the predetermined maximum call data bandwidth amongst calls currently being handled by the subscriber terminal;

a bandwidth allocator for allocating, with reference to the information in said storage, a call data bandwidth for a call, the bandwidth manager being arranged to use the call data bandwidth allocated by the bandwidth allocator to update the information in the storage; and a call manager, responsive to a request to establish a call, to employ the bandwidth allocator to determine the call data bandwidth to be allocated to that call, and to then communicate with the central terminal to establish a call over the wireless link having the allocated call data bandwidth.

11. A subscriber terminal as claimed in claim 10, further comprising a call type identifier, responsive to the request to establish a call, for determining the type of that call, the bandwidth allocator using the call type information when allocating the call data bandwidth for the call.

12. A subscriber terminal as claimed in claim 11, wherein the bandwidth allocator has access to priority information identifying the relative priorities of different call types, the bandwidth allocator being arranged to allocate, subject to the available bandwidth indicated by the information in the storage, calls of a higher priority call type a larger call data bandwidth than calls of a lower priority call type.

13. A subscriber terminal as claimed in claim 12, wherein the priority information specifies a default bandwidth associated with each call type, and the bandwidth allocator is arranged to allocate to a call of a particular call type the default bandwidth associated with that call type, subject to the available bandwidth indicated by the information in the storage being sufficient to support a call of that default bandwidth.

14. A subscriber terminal as claimed in claim 13, wherein the default bandwidth for each call type is dependent on a service level assigned to the item of telecommunications equipment associated with that call.

15. A subscriber terminal as claimed in claim 10, wherein the bandwidth allocator, when allocating call data bandwidth for a call to be established, can alter the call data bandwidth allocated to other calls whilst those other calls are in progress.

16. A subscriber terminal as claimed in claim 10, wherein an overhead channel is defined within the frequency channel for passing control information between the subscriber terminal and the central terminal, the call manager being responsive to the allocation of call data bandwidth by the bandwidth allocator to insert a bandwidth allocation signal within the overhead channel signal transmitted to the central terminal, the central terminal thereby receiving information about the call data bandwidth allocated by the bandwidth allocator.

17. A subscriber terminal as claimed in claim 10, further comprising a compression circuit, responsive to information from the bandwidth allocator identifying the allocated call data bandwidth, for compressing the call data for the corresponding call so that the call data can be transmitted within the allocated call data bandwidth of the frequency channel.

18. A subscriber terminal as claimed in claim 17, wherein control and signalling data is transmitted over the frequency channel in addition to user data, the predetermined maximum call data bandwidth managed by the subscriber terminal relating to the bandwidth available for transmission of user data, and the compression circuit being arranged only to compress the user data.

19. A subscriber terminal as claimed in claim 10, wherein a Code Division Multiple Access (CDMA) technique is applied to signals transmitted over said frequency channel so as to create a plurality of orthogonal channels within said frequency channel, each orthogonal channel having said predetermined maximum call data bandwidth, and the subscriber terminal being arranged to manage the call data bandwidth for each orthogonal channel.

20. A method of managing calls between a central terminal and a subscriber terminal of a wireless telecommunications system, a number of items of telecommunications equipment being connectable to the subscriber terminal, and the subscriber terminal being arranged to pass call data between said items of telecommunications equipment and the central terminal via a wireless link, the wireless link being provided on a frequency channel with a predetermined maximum call data bandwidth for the transmission of said call data, the method comprising the steps of:

maintaining information about allocation of the predetermined maximum call data bandwidth amongst calls currently being handled on the frequency channel;

responsive to a request to establish a call, allocating, with reference to the information maintained at said maintaining step, a call data bandwidth for the call;

using the call data bandwidth allocated at said allocating step to update the information in a storage; and establishing a call over the wireless link between the central terminal and the subscriber terminal having the allocated call data bandwidth.

21. A method as claimed in claim 20, further comprising the step of, responsive to the request to establish a call, determining the call type of that call, the call type information being used at said allocating step when allocating the call data bandwidth for the call.

22. A method as claimed in claim 21, wherein priority information identifying the relative priorities of different call types is used at said allocating step, such that calls of a higher priority call type are allocated a larger call data bandwidth than calls of a lower priority call type, subject to the available bandwidth indicated by the information stored at said maintaining step.

23. A method as claimed in claim 22, wherein the priority information specifies a default bandwidth associated with each call type, and at said allocating step a call of a particular call type is allocated the default bandwidth associated with that call type, subject to the available bandwidth indicated by the information stored at said maintaining step being sufficient to support a call of that default bandwidth.

24. A method as claimed in claim 23, wherein the default bandwidth for each call type is dependent on a service level assigned to the item of telecommunications equipment associated with that call.

25. A method as claimed in claim 20, further comprising the step of, when allocating call data bandwidth for a call to be established at said allocating step, altering the call data bandwidth allocated to other calls whilst those other calls are in progress.

26. A method as claimed in claim 20, wherein an overhead channel is defined within the frequency channel for passing control information between the subscriber terminal and the central terminal, and the method further comprises the step of, responsive to the allocation of call data bandwidth at said allocating step, inserting a bandwidth allocation signal within the overhead channel signal transmitted to the central terminal, the central terminal thereby receiving information about the call data bandwidth allocated by the bandwidth allocator.

27. A method as claimed in claim 20, further comprising the step of, responsive to the bandwidth allocation at said allocating step, compressing the call data for the corresponding call so that the call data can be transmitted within the allocated call data bandwidth of the frequency channel.

28. A method as claimed in claim 27, wherein control and signalling data is transmitted over the frequency channel in addition to user data, said predetermined maximum call data bandwidth relating to the bandwidth available for transmission of user data, and the compressing step being applied only to the user data.

29. A method as claimed in claim 20, wherein a Code Division Multiple Access (CDMA) technique is applied to signals transmitted over said frequency channel so as to create a plurality of orthogonal channels within said frequency channel, each orthogonal channel having said predetermined maximum call data bandwidth, and the method being employed to manage the call data bandwidth for each orthogonal channel.

* * * * *